INVENTOR.
Andreas Stihl
BY
Patent Agent

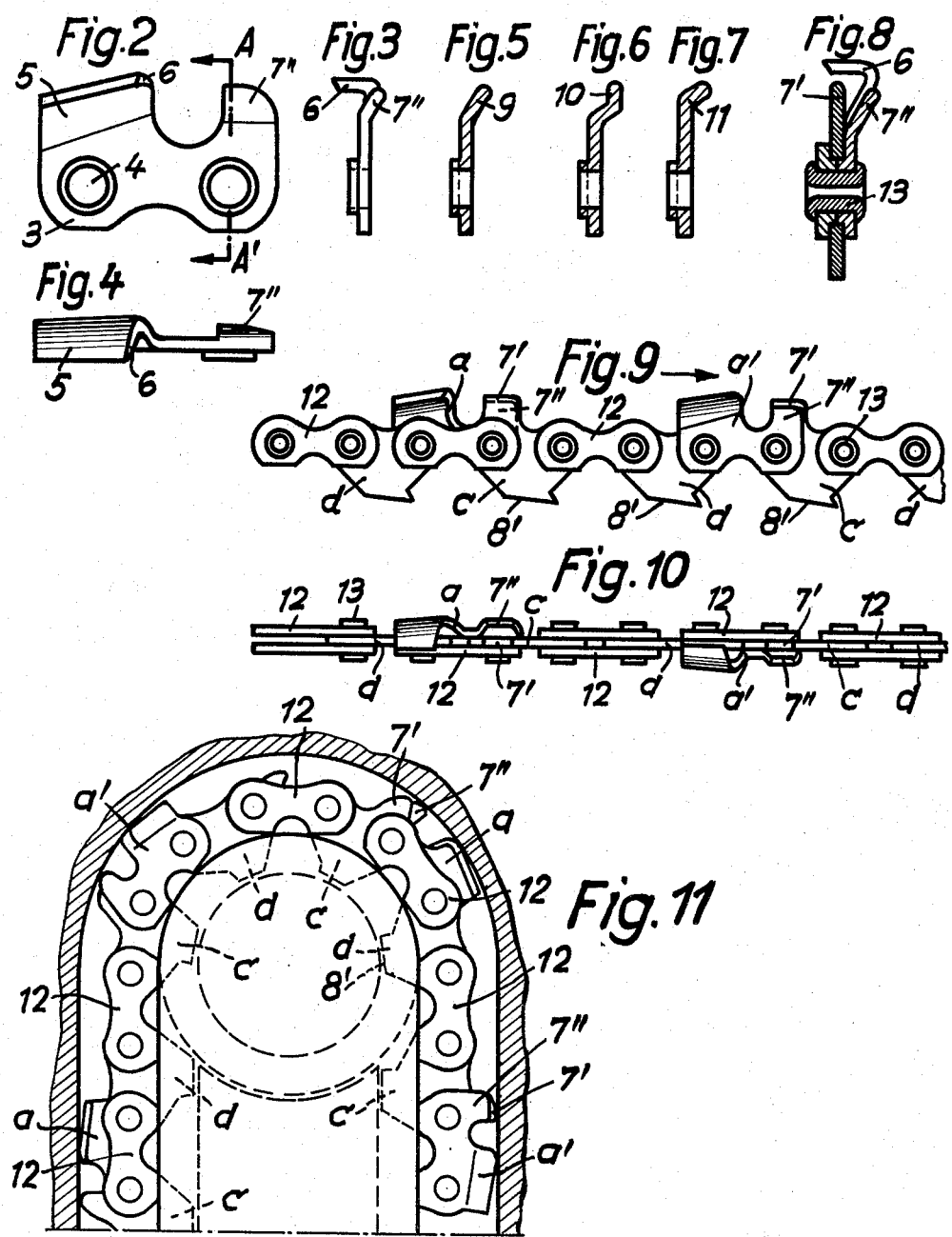

United States Patent Office 2,963,055
Patented Dec. 6, 1960

2,963,055
CHAIN FOR MOTOR CHAIN SAWS
Andreas Stihl, Badstr. 169, Neustadt, Waiblingen, Germany
Filed Aug. 28, 1958, Ser. No. 757,865
4 Claims. (Cl. 143—135)

The present invention concerns a chain for motor chain saws in which angled round or angular planing teeth are employed as cutting tools.

It is a well-known fact that planing teeth of such sawing chains have the tendency to enter too deeply into the wood whereby chips of undue thickness are cut out of the gap in the wood. The planing teeth in such an instance "bite" into the wood so that the chain jams or sticks and exerts an undue stress on the driving motor. In this connection, the sawing chain is sometimes subjected to such a stress that it breaks.

In order to maintain the depth of penetration of the planing teeth into the wood within permissible limits, it is customary to provide the chain with abutments preceding the planing teeth. In most instances, depth stops only are employed, sometimes, however, also lateral or traversing stops are used. According to one of the heretofore known arrangements, the curved planing teeth proper are preceded by a plane depth stop the upper side of which has a depth limiting member the maximum height of which approximately equals the lowest height of the planing teeth. This depth stop is furthermore below the connecting links provided with a follower cam adapted to slide in a recess of a guiding rail. These limiting or stopping chain links have the drawback that during the ordinary cutting operation with the cutting direction perpendicular to the longitudinal axis of the guiding line, they will exert an effect which is different from that exerted when carrying out a boring operation namely during a cut in the direction of the longitudinal axis of the guiding rail.

It is expedient to mount the depth stop as close as possible ahead of the planing tooth, and it is this reason why with most chains such stop is mounted on the same chain link as the angled planing edge. With a heretofore known chain saw, the planing tooth member has directly arranged thereon a depth stop in such a way that the planing tooth together with the depth stop forms a complete tooth. Such an arrangement has the advantage that the cutting edge is guided properly. The cutting edge will then not be able to cut too deeply into the gap of the wood and will also be protected against lateral deviation or slip because in most instances the bottom of the gap of the wood is round. The depth stop pressed in the gap against the wood thus also prevents a strong lateral deviation of the planing tooth and yields a relatively smooth cutting surface.

However, practice has shown that also this type of depth stop completely prevents the boring operation. In this connection, it should be noted that if the height of the depth stop is properly selected for ordinary work, it will when boring rest against the curvature in the gap of the wood to such an extent that the planing cutting edge will not contact the wood any longer. If on the other hand the height of the depth stop will be correspondingly reduced, it will be possible properly to bore with such saw chain, however, difficulties will then be encountered during the ordinary cutting operation inasmuch as the chips will then become too thick.

If the depth stop is mounted on that chain link which precedes the respective planing tooth, which arrangement, as mentioned above, is well-known, the height of the depth stop may be so selected that a suitable chip thickness will be obtained during ordinary cutting as well as during the boring operation. On the other hand, with such an arrangement the planing tooth is only insufficiently held. Under certain circumstances, by turning about the chain links, the planing teeth may tilt up or buck and above all slip toward the side out of the gap of the wood. This will not only subject the chain to considerable stress but will also result in a rather rough cut. Roughly cut surfaces are, however, undesired in forestry because, above all, in such instance the end faces of the logs cannot be used any longer for the customary marking of the trees.

The situation could, of course, be remedied by equipping each motor chain saw with one saw chain for ordinary work and with another saw chain for boring. However, since with modern short guiding rails, the said two operations frequently alternate, the repeated exchanging of the saw chains will bring about an undesired delay in the work.

It is, therefore, an object of the present invention to provide a saw chain for motor chain saws which will overcome the above mentioned drawbacks.

It is also an object of the present invention to provide a saw chain for motor chain saws which can equally well be used for ordinary cutting and also for boring operations and will furnish a considerably smoother cut than heretofore known saw chains.

It is also an object of the present invention to provide a saw chain of the type set forth in the preceding paragraphs the cost of production of which will substantially not be higher than that of an ordinary chain.

These and other objects and advantages of the invention will appear more clearly from the following specification in connection with the accompanying drawings, in which:

Fig. 2 illustrates a side view of a planing tooth according to the invention with lateral or traversing stop for the ordinary cut which is also equipped with a depth stop for the grooving operation.

Fig. 3 is a front view of the tooth according to Fig. 2.

Fig. 4 is a top view of the tooth of Fig. 2.

Fig. 5 is a section along the line V—V of Fig. 2.

Figs. 6 and 7 are sections similar to that of Fig. 5 through a planing tooth according to the invention, but with the teeth angled differently.

Fig. 8 is a cross section through the saw chain according to the invention.

Fig. 9 is a side view of the saw chain according to the invention.

Fig. 10 is a top view of the saw chain of Fig. 9.

Fig. 11 is a chain in which the planing teeth members and depth stop members are alternately connected to each other.

General arrangement

The saw chain according to the present invention is characterized primarily in that the planing tooth member or link has the planing tooth preceded by a lateral or traversing stop with a lateral portion angled off from the center of the chain. The height of said stop is selected in conformity with the depth limit in the curvature of the gap in the wood during the boring operation. Thus, with the planing tooth according to the invention, not only one but two depth stops precede the planing tooth. These stops do not reduce the length of the space for the deposit of the chip inasmuch as they are so designed that during the ordinary working operation they will nearly precisely cover each other as to their contour lines. Only during the boring operation, the depth stops spread apart inasmuch as they are mounted on separate chain members and therefore tilt away from each other during the turning of the chain links. However, the said two depth stops are not precisely of the same height. The stop which is mounted on the chain member preceding the planing tooth has a normal length as it is suitable for boring and ordinary work. However, the stop on the chain member with the planing tooth is shorter, for instance, by 2 millimeters and furthermore is somewhat angled or cranked toward the outside of the gap. In this way, the last mentioned stop will be effective during the boring operation only for limiting the depth, with both working operations, however, it will prevent the lateral deviation of the planing tooth.

For the above reason, the saw chain according to the invention is equally useful for normal work and boring work and furthermore yields a considerably smoother cutting surface than heretofore known saw chains. The costs of production of such a saw chain are practically not higher than that of ordinary chains inasmuch as the number of the chain members is not increased. The increase quantity of material is irrelevant with the planing tooth member.

*Structural arrangement*

Figure 1:
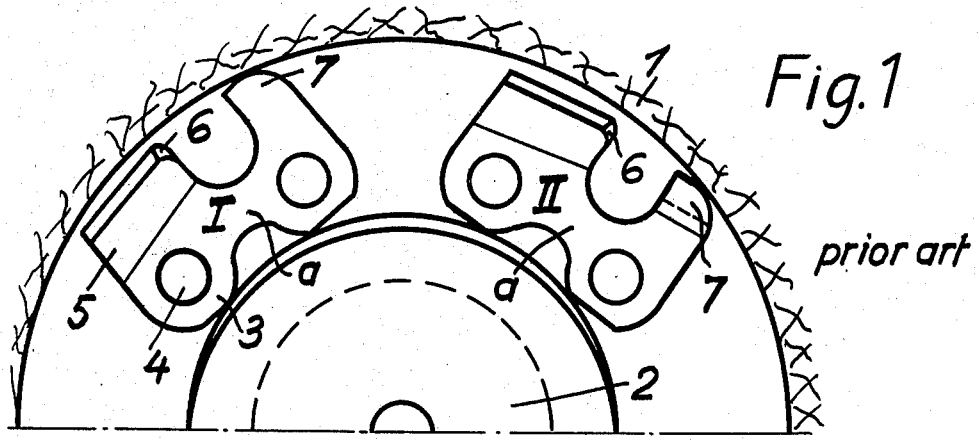
Fig. 1 illustrates planing teeth with depth stops in various positions in the gap of the wood.
Figure 1A:
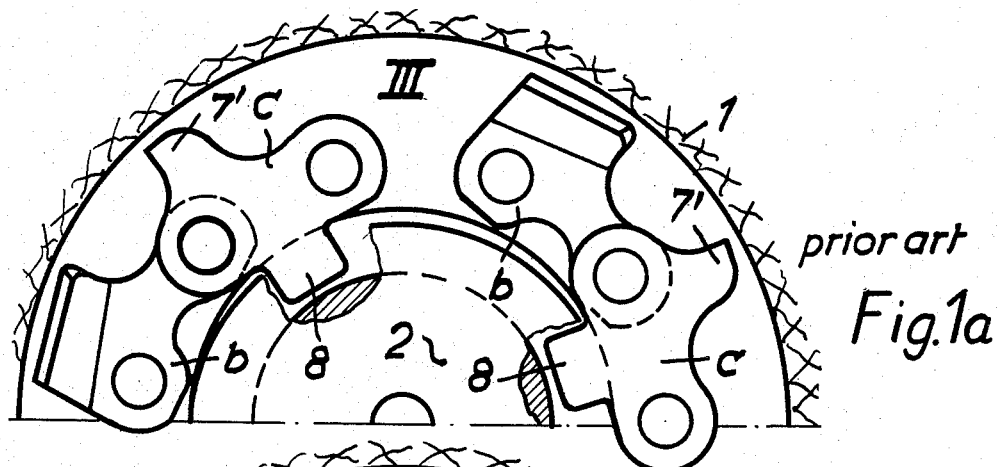
Figure 1B:
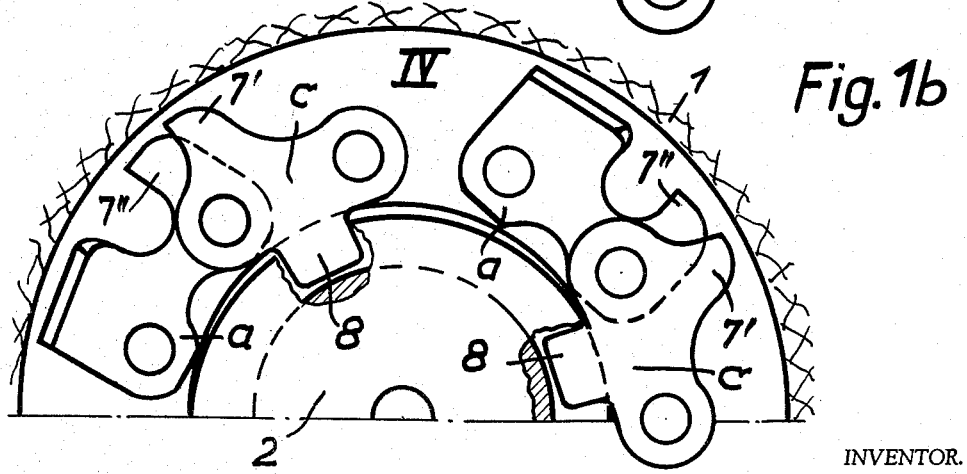

Referring now to the drawings in detail, Fig. 1 in position I shows a planing tooth of a heretofore known type in its normal cutting position. It fills in the space between the bottom of groove 1 and the guide rail 2 on which the planing tooth rests by means of the fishplate portions 3. Above one rivet bore 4 there is arranged the angled planing cutter 5 with the cutting edge 6. Above the other rivet bore there is arranged the stop 7. This tooth configuration $a$ is suitable for the ordinary cut of position I inasmuch as the depth stop 7 is not tangent to the bottom 1 of the gap as long as the thickness of the chip has not reached an undue magnitude. If, however, the depth stop 7 during the boring operation gets into the curved portion, i.e. into position II, the depth stop 7 contacts the bottom of the gap and prevents any cutting of the cutting edge 6. This known tooth configuration $a$ is thus not suitable for a boring operation.

The heretofore known tooth configuration $b$ with the preceding chain link $c$ carrying the depth stop will, however, with the depth stop 7' at the same level as the depth stop 7 allow the boring in position III as well as the normal operation in position IV. However, the lateral guiding of the planing tooth and also the bucking or tilting up of the planing tooth will not be sufficiently prevented. If, however, the shape of $a$ is maintained for the planing tooth, whereas the depth stop 7 is reduced to the shape and magnitude 7" of the lateral stop, and is slightly laterally bent off and, in addition thereto, chain link 7c is employed with the customary depth stop 7' and the cam means 8, a smooth cut will be obtained and also a safe guiding in the ordinary position IV as well as in position III during the boring.

A certain improvement is already obtained when the stop 7 is kept vertically. The lateral guiding is, however, improved by a bent-off portion 9 or a cranked portion 10 or a flanging 11 (Figs. 5 to 7).

Such chain according to the invention is composed in the manner shown in Figs. 9 and 10 starting from the left toward the right, in other words a chain will be obtained in which the fishplates 12 are followed by a chain member $d$ provided e.g. with cam means 8', and followed by a right-hand planing tooth $a'$ with oppositely located fishplates etc. When sawing thin trunks, due to the fact that less space for the chips will be needed, the right-hand planing tooth $a'$ may also directly be connected to the next following chain link $c$ whereby the two oppositely located fishplates 12 and the member $d$ may be eliminated. This chain then has the advantage of remaining sharp for a longer period of time inasmuch as it has twice the number of planing teeth over the same length of the chain. Either hollow rivets 13 or solid rivets may be employed in a manner known per se for riveting the parts together.

It is, of course, to be understood that the present invention is, by no means, limited to the particular construction shown in the drawings but also comprises any modifications within the scope of the appended claims.

What I claim is:

1. A saw chain for motor chain saws, which includes: a plurality of spaced planing tooth links with angled-off planing teeth, and a plurality of chain links pivotally connected to said planing tooth links and equipped with depth stops for limiting the cutting depth of said planing teeth along both a curved groove and a straight cut, each of said tooth links being directly preceded by one of said chain links when looking in the working direction of said saw chain, and each of said planing tooth links being provided with a lateral movement stop preceding the respective planing tooth pertaining thereto when looking in working direction of said chain, each said lateral movement stop transversely overlapping the depth stop of the adjacent tooth link and having less height than said depth stop, each of said lateral movement stops including an angled portion directed away from the longitudinal plane of symmetry of said chain.

2. A saw chain for motor chain saws, which includes: a plurality of spaced planing tooth links with angled-off planing teeth, and a plurality of chain links pivotally connected to said planing tooth links and equipped with depth stops for limiting the cutting depth of said planing teeth along both a curved groove and a straight cut, each of said tooth links being directly preceded by one of said chain links when looking in the working direction of said saw chain, and each of said planing tooth links being provided with a lateral movement stop preceding the respective planing tooth pertaining thereto when looking in working direction of said chain, each said lateral movement stop transversely overlapping the depth stop of the adjacent tooth link and having less height than said depth stop, the depth stops of said tooth links being alternately linked to opposite sides of said lateral movement stops, each of said lateral movement stops including an angled portion directed away from the longitudinal plane of symmetry of said chain.

3. A saw chain for motor chain saws, which includes: a plurality of first links spaced from each other in longitudinal direction of said saw chain, a plurality of second links respectively linked to and interconnecting each two successive ends of successive first links, and a plurality of tooth links with angled-off planing teeth respectively linked to and interconnecting every other two adjacent ends of two adjacent second links, said second links being equipped with depth stops for limiting the cutting depth of said planing teeth along both a curved groove and a straight cut, and each of said planing tooth links being provided with a lateral movement stop preceding the planing tooth pertaining thereto when looking in working direction of said chain, each said lateral movement stop transversely overlapping the depth stop of the adjacent tooth link and having less height than said depth stop, each of said lateral movement stops including an angled portion directed away from the longitudinal plane of symmetry of said chain, and the depth stops of said tooth links being alternately linked to opposite sides of said lateral movement stops while facing opposite sides.

4. A saw chain according to claim 1, in which each tooth link and preceding chain link are pivotally connected about an axis through the bases of said overlapping stops.

References Cited in the file of this patent

UNITED STATES PATENTS

| | | |
|---|---|---|
| 2,558,678 | Garrett | June 26, 1951 |
| 2,589,015 | Merz | Mar. 11, 1952 |
| 2,658,537 | Ackley | Nov. 10, 1953 |
| 2,826,226 | Donley | Mar. 11, 1958 |
| 2,850,057 | Carlberg | Sept. 2, 1958 |